(12) United States Patent
Bowyer et al.

(10) Patent No.: US 8,901,763 B2
(45) Date of Patent: Dec. 2, 2014

(54) APPARATUS AND METHOD FOR REDUCING YAW ERROR IN WIND TURBINES

(75) Inventors: Robert Bowyer, London (GB); Justin Creaby, Broomfield, CO (US)

(73) Assignee: Vesta Wind Systems A/S, Aarhus N. (DK)

( * ) Notice: Subject to any disclaimer, the term of this patent is extended or adjusted under 35 U.S.C. 154(b) by 26 days.

(21) Appl. No.: 13/807,564

(22) PCT Filed: Jun. 29, 2011

(86) PCT No.: PCT/DK2011/050249
§ 371 (c)(1),
(2), (4) Date: Dec. 28, 2012

(87) PCT Pub. No.: WO2012/000513
PCT Pub. Date: Jan. 5, 2012

(65) Prior Publication Data
US 2013/0099497 A1      Apr. 25, 2013

Related U.S. Application Data

(60) Provisional application No. 61/360,108, filed on Jun. 30, 2010.

(30) Foreign Application Priority Data

Jun. 30, 2010   (GB) .................................. 1011044.3

(51) Int. Cl.
| | | |
|---|---|---|
| F03D 9/00 | (2006.01) | |
| H02P 9/04 | (2006.01) | |
| F03D 7/04 | (2006.01) | |
| F03B 7/00 | (2006.01) | |
| F03D 7/02 | (2006.01) | |

(52) U.S. Cl.
CPC ....... *F03D 7/0204* (2013.01); *F05B 2270/8042* (2013.01); *F03D 7/042* (2013.01); *Y02E 10/723* (2013.01); *F05B 2260/845* (2013.01); *F05B 2270/32* (2013.01)
USPC ................................................ 290/44; 416/9

(58) Field of Classification Search
CPC ..... Y02E 10/723; Y02E 10/72; F03D 7/0204; F03D 7/0208; F05B 2270/32; F05B 2270/321; F05B 2260/821; F05B 2270/20; Y02B 10/30
USPC .................................................. 290/44; 416/9
See application file for complete search history.

(56) References Cited

U.S. PATENT DOCUMENTS

| | | | | |
|---|---|---|---|---|
| 4,565,929 A | * | 1/1986 | Baskin et al. .................. | 290/44 |
| 5,289,041 A | * | 2/1994 | Holley ............................ | 290/44 |

(Continued)

FOREIGN PATENT DOCUMENTS

| | | |
|---|---|---|
| EP | 1460266 A2 | 9/2004 |
| EP | 1505299 A1 | 2/2005 |

(Continued)

OTHER PUBLICATIONS

International Search Report and Written Opinion dated Mar. 27, 2012 for International Application No. PCT/DK2011/050249, 12 pages.

(Continued)

*Primary Examiner* — Pedro J Cuevas
(74) *Attorney, Agent, or Firm* — Patterson & Sheridan, LLP

(57) ABSTRACT

A wind turbine with a rotor comprising one or more rotor blades and a hub, the hub being attached to a nacelle, a yaw system for rotating the rotor to orient it in a wind direction, and one or more line of sight detectors for detecting a component of wind velocity. The one or more detectors are mounted such that they rotate under the action of the yaw system. A control system is coupled to the one or more detectors and is arranged to compare the detected wind velocity component with a wind velocity value and control the yaw system in response to the comparison. The nacelle can be rotated under control of the control system until the yaw error is substantially zero.

41 Claims, 9 Drawing Sheets

(56) References Cited

U.S. PATENT DOCUMENTS

| | | | |
|---|---|---|---|
| 7,086,835 B2* | 8/2006 | Yoshida | 416/9 |
| 7,244,100 B2* | 7/2007 | Yoshida | 416/9 |
| 7,342,323 B2* | 3/2008 | Avagliano et al. | 290/55 |
| 7,436,083 B2* | 10/2008 | Shibata et al. | 290/44 |
| 7,487,673 B2* | 2/2009 | Ormel et al. | 73/170.07 |
| 7,763,989 B2* | 7/2010 | Kinzie et al. | 290/44 |
| 8,025,476 B2* | 9/2011 | Zheng et al. | 415/1 |
| 8,057,174 B2* | 11/2011 | Scholte-Wassink | 416/35 |
| 8,093,738 B2* | 1/2012 | Stiesdal | 290/44 |
| 8,277,167 B2* | 10/2012 | Shibata et al. | 415/2.1 |
| 8,410,625 B2* | 4/2013 | Stiesdal | 290/44 |
| 8,622,698 B2* | 1/2014 | Kristoffersen | 416/1 |
| 8,674,537 B2* | 3/2014 | Tanaka et al. | 290/44 |
| 2007/0035135 A1* | 2/2007 | Yoshida | 290/44 |
| 2008/0084068 A1* | 4/2008 | Shibata et al. | 290/44 |
| 2009/0039651 A1* | 2/2009 | Stiesdal | 290/44 |
| 2010/0092291 A1* | 4/2010 | Scholte-Wassink | 416/37 |
| 2010/0092292 A1* | 4/2010 | Nies et al. | 416/41 |
| 2010/0133817 A1* | 6/2010 | Kinzie et al. | 290/44 |
| 2011/0210549 A1* | 9/2011 | Haag et al. | 290/44 |
| 2012/0049520 A1* | 3/2012 | Stiesdal | 290/44 |
| 2012/0112460 A1* | 5/2012 | Kjær | 290/44 |
| 2012/0128488 A1* | 5/2012 | Kristoffersen | 416/31 |
| 2012/0139248 A1* | 6/2012 | Bertolotti | 290/44 |
| 2012/0280500 A1* | 11/2012 | Tanaka et al. | 290/44 |
| 2012/0280501 A1* | 11/2012 | Tanaka et al. | 290/44 |
| 2013/0033040 A1* | 2/2013 | Bowyer et al. | 290/44 |
| 2013/0062880 A1* | 3/2013 | Bowyer et al. | 290/44 |
| 2013/0106107 A1* | 5/2013 | Spruce et al. | 290/44 |
| 2014/0035285 A1* | 2/2014 | Creaby et al. | 290/44 |

FOREIGN PATENT DOCUMENTS

| | | |
|---|---|---|
| EP | 1559910 A1 | 8/2005 |
| EP | 2017468 A1 | 1/2009 |
| EP | 2048507 A2 | 4/2009 |
| EP | 2154362 A1 | 2/2010 |

OTHER PUBLICATIONS

GB Combined Search and Examination Report dated Oct. 15, 2010 for Application No. GB1011044.3, 6 pages.

* cited by examiner

APPARATUS AND METHOD FOR REDUCING YAW ERROR IN WIND TURBINES

CROSS-REFERENCE TO RELATED APPLICATIONS

This application claims the benefit of PCT International Application No. PCT/DK2011/50249 entitled "Apparatus and Method For Reducing Yaw Error In Wind Turbines" and filed on Jun. 29, 2011 and further claims the benefit of U.S. Provisional Application Ser. No. 61/360,108 entitled "Apparatus and Method For Reducing Yaw Error In Wind Turbines" and filed Jun. 30, 2010, and claims priority to Great Britain Patent Application No. 1011044.3 entitled "Apparatus and Method For Reducing Yaw Error In Wind Turbines" and filed Jun. 30, 2010.

FIELD OF THE INVENTION

This invention relates to wind turbines and more specifically to a wind turbine utilising a method of control and/or a controller for reducing the yaw error associated with a yaw adjusting system.

BACKGROUND TO THE INVENTION

FIG. 1A illustrates a wind turbine 1, comprising a wind turbine tower 2 on which a wind turbine nacelle 3 is mounted. At least one rotor blade 5 is attached to a hub 6 to form the rotor. Each blade can rotate about its own longitudinal axis. This is called blade pitching. The hub 6 is connected to the nacelle 3 through a low speed shaft (not shown) extending from the nacelle front. The axis or rotation of the rotor is along the low speed shaft. The wind turbine illustrated in FIG. 1A may be a small model intended for domestic or light utility usage, or may be a large model, such as those that are suitable for use in large scale electricity generation on a wind farm. In the latter case, the diameter of the rotor may be as large as 150 meters or more.

The rotor blades of wind turbines are designed to extract power from the wind by virtue of their aerodynamic shape, and subsequent wind induced rotation. For horizontal axis wind turbines, the rotation of the rotor about its axis turns a drive shaft connected in turn to a generator which produces electricity. A low speed drive shaft may be used, coupled to a high speed shaft, or alternatively a direct drive shaft may be used. For horizontal axis wind turbines to operate efficiently and extract the maximum power from the wind, the wind turbine nacelle is rotated to make the rotor face the wind to the greatest extent possible, such that the rotational axis of the rotor is aligned with the wind direction.

Wind turbines, and in particular larger wind turbines, will have a system for rotating the nacelle such that the rotor is oriented in a wind direction. These systems are commonly known as yaw systems, or azimuth drives, and allow a wind turbine to continue to extract maximum energy from oncoming winds, despite changes in wind direction. A purpose of the yaw system is therefore to correctly orient the rotor to the correct yaw angle relative to the prevailing wind direction so as to extract the optimum amount of energy from the wind. The yaw system is usually located between the wind turbine tower and the nacelle and typically comprises a bearing that is fully rotatable around an axis co-linear with the tower, and one or more electric or hydraulic drives for rotating the bearing relative to the tower. In this way, the nacelle, mounted on the bearing, can be turned through 360 degrees in the horizontal plane.

Many different yaw systems are known, and often comprise a number of components integrated in part in the nacelle and in part in the top of the turbine tower. The overall system for wind direction tracking might comprise an azimuth bearing, yaw drive, yaw brakes, a locking device, and a control system. The azimuth bearing allows the nacelle to rotate relative to the turbine tower. The yaw drive is coupled to the bearing via a gearing system and provides the force to rotate the nacelle about the bearing. Hydraulic or electric drive systems are widely used. The yaw brakes absorb the yawing moment after a completed yawing operation and are required unless the yaw drive has an integrated braking function. A locking device is commonly used in larger turbines so that the yaw drive is positively locked in place. The control system provides the operating logic required to automatically position the rotor blades into the wind. For the avoidance of doubt, the present invention can be used with any type of yaw system.

Since it is desirable, in upwind turbines, for the turbine rotor to face directly into oncoming wind at all times during operation to extract maximum energy, it is useful to define the yaw error and yaw angle. The yaw error is the angular difference between the direction of the wind, and the direction in which rotor is facing. FIG. 1B shows some internal components of a typical wind turbine, using the same references as FIG. 1A, including the yaw drive system 20 and yaw motor 21. FIG. 1B shows how the blades 5 can pitch about their longitudinal axis, and how the nacelle can yaw about the axis of the turbine tower. The direction in which the rotor is facing can be considered as the direction in which the nacelle is pointing, or the direction in which the axis of rotation of the rotor is pointing, since they are the same. When the yaw error is zero or substantially zero, the blades are considered to be facing the wind direction. The yaw angle can be defined as the angular difference between a 0° point, usually defined by a geographical direction such as north, and the direction in which the rotor is facing.

The purpose of the control system is to ensure that the yaw error is as small as possible, whilst also ensuring that change in yaw angle to correct yaw error is not too sensitive to avoid continuous small yaw movements which would result in premature wear of the mechanical components. Various operating methods are possible to try to ensure such a compromise, but they will typically involve the measuring of a mean value of wind direction using a wind sensor and a comparison with the azimuth position of the nacelle to determine the yaw error. If the yaw error exceeds a particular threshold then the yaw system is activated to change the yaw angle to reduce the yaw error.

Known yaw control systems rely on accurate wind direction measurements, which are usually performed by wind vanes or other instruments such as ultrasonic anemometers. In addition, wind direction instruments are often mounted on the nacelle of the turbine in a region of airflow that is directly affected by the rotor blades which may result in an incorrect reading. We have appreciated that there is a need for an improved system for determining and controlling yaw error to maximise energy capture and reduce fatigue loads.

SUMMARY OF THE INVENTION

The invention is defined in the independent claims to which reference should now be made. Advantageous features are set forth in the dependent claims.

Embodiments of the invention may relate to a wind turbine comprising a rotor, and a yaw system. The rotor comprises one or more rotor blades and a hub, the hub being typically attached to a nacelle. The yaw system is arranged to rotate the nacelle, and with it the rotor, to position the rotor towards a wind direction. One or more detectors are provided for detecting wind speed. The one or more detectors are mounted such that they rotate under the action of the yaw system. Embodiments may apply to upwind turbines, in which the turbine blades are positioned in front of the nacelle and face into the wind, or downwind turbines in which the blades are positioned to the rear of the nacelle and face away from the wind. Broadly speaking, the yaw system is controlled in response to the wind speeds detected by the one or more detectors. The nacelle can be rotated under control of the control system until the yaw error is substantially zero.

Embodiments of the invention may include, on the wind turbine, a first detector for detecting a component of wind velocity along a line of sight, the detector being mounted such that it rotates under the action of the yaw system. A control system is coupled to the detector and arranged to compare the detected component of wind velocity with a wind velocity value and to control the yaw system in response to the comparison. Comparing the detected component of wind velocity with a wind velocity value, and controlling the yaw system in response, allows the yaw system to be controlled without determining, measuring or calculating a wind direction. Embodiments may be considered to control the turbine directly in response to a detected wind velocity component, rather than requiring intermediate steps such as calculating a wind direction. The control system may be arranged to control the yaw to make the detected component of wind velocity and the wind velocity value, or their magnitudes, substantially equal. The wind velocity value may be zero or substantially zero.

Embodiments of the invention may include, on the wind turbine, a first detector and a second detector both for detecting a component of wind velocity along a line of sight, the detectors being mounted such that they rotate under the action of the yaw system. A control system is coupled to the detectors and arranged to compare the detected component of wind velocity from the first detector with the detected component of wind velocity from the second detector and to control the yaw system in response to the comparison.

The one or more detectors are mounted on the turbine such that they rotate under the action of the yaw system, meaning that they rotate in the yaw direction when it is activated. The detectors may be mounted on the nacelle, such that they rotate with the nacelle under the action of the yaw system.

The detectors may be arranged such that when the magnitude of the component of wind velocity detected by the first detector is substantially equal to the magnitude of the component of wind velocity detected by the second detector the yaw system is correctly aligned. The control system may be arranged to compare the component of wind velocity detected by the first detector with that of the second detector and to control the yaw system to cause their magnitudes to be substantially equal.

The first detector and the second detector may be arranged such that the angle formed between the line of sight of the first detector and the axis of rotation of the rotor is substantially equal and opposite to the angle formed between the line of sight of the second detector and the axis of rotation of the rotor. More specifically, the first detector and the second detector may be arranged such that the line of sight of the first detector points in substantially the opposite direction to the line of sight of the second detector.

Embodiments of the invention may include, on the wind turbine, a first detector for detecting a component of wind velocity along a line of sight, the detector being mounted such that it rotates under the action of the yaw system. A control system is coupled to the detector and arranged to compare the detected component of wind velocity with a wind velocity value and to control the yaw system in response to the comparison. Comparing the detected component of wind velocity with a wind velocity value, and controlling the yaw system in response, allows the yaw system to be controlled without determining, measuring or calculating a prevailing wind direction. The detector is arranged such that the line of sight does not pass through the area swept out by the rotor blades during rotation, Preferably this is achieved by the detector being mounted on the nacelle and pointing in a direction such that the line of sight does not pass through the area swept by the rotor blades.

Preferably the one or more detectors are arranged such that they measure a component of wind velocity substantially perpendicular to the axis of rotation of the rotor so as to reduce the calculations required to determine when the rotor is facing the wind direction. Even more preferably, two detectors are used and arranged to provide beams in opposite directions so as to reduce errors due to flow or wake expansion or deflected wake. Alternatively, the one or more detectors may be arranged such that their lines of sight are substantially perpendicular to the expected airflow around the rotor when the yaw system is correctly aligned. This allows compensation for the wake expansion caused by the rotor. The detectors may be arranged such that the line of sight is substantially parallel to the ground or turbine base.

The control system may be arranged to control the yaw system to rotate the nacelle until a predetermined wind velocity is measured by the one or more detectors. This means that the control system does not need to calculate an actual value for the yaw error, but merely needs to adjust the yaw angle until the predetermined wind velocity is measured. The predetermined wind velocity is preferably a minimum velocity and may be zero.

The detectors may be arranged to detect the wind velocity at a distance from the detectors, the distance being greater than or equal to the length of the one or more rotor blades, so as to avoid the disturbed airflow behind the rotors. The distance may preferably be between 1 and 2 times the rotor blade length, and more preferably between 1.2 and 2 times the rotor blade length. The detectors may additionally, or alternatively, each be arranged to detect wind velocity components at a plurality of distances from the detectors, along their line of sight.

The detectors are preferably Doppler anemometers, and in particular may be LIDAR detectors. SODAR (SOund Detection And Ranging), RADAR (RAdio Detection And Ranging) and LDV (Laser Doppler Velocimetry) may also be used.

Corresponding methods of controlling a wind turbine may also be provided according to embodiments of the invention. One method involves, at the controller, receiving a value from the detector indicating the component of wind velocity along a line of sight and comparing the wind velocity component with a wind velocity value to determine whether the rotor is aligned with a wind direction. A control signal is sent to the yaw system, in response to the comparison, to rotate the nacelle if the rotor is not aligned with a wind direction. The method may involve simply comparing the detected incident wind velocity component with a predetermined wind velocity value to determine if the rotor is aligned with a wind direction. As mentioned above, comparing the detected component of wind velocity with a wind velocity value, and controlling the yaw system in response, allows the yaw system to be controlled without determining, measuring or calculating a wind direction. Embodiments may be considered to control the turbine directly in response to a detected wind velocity component, rather than requiring intermediate steps such as calculating a wind direction. The method may optionally further comprise sending control signals to control the yaw system to yaw the turbine when the detected component of wind velocity and the wind velocity value, or their magnitudes, are not substantially equal, or sending a control signal to yaw the turbine until a predetermined wind velocity value is measured by the detector. A control signal may be sent to the yaw system to rotate the nacelle if the detected incident wind speed is higher than a predetermined value. Alternatively, the method could involve determining a yaw error based on the received values and controlling the yaw system based on the calculated yaw error.

Embodiments may involve, at the controller, receiving a value from a first and second detector, both indicating a component of wind velocity along a line of sight, and comparing the wind velocity component from the first detector with that of the second detector to determine whether the rotor is aligned in a wind direction. A control signal is sent to the yaw system, in response to the comparison, to rotate the nacelle if the rotor is not aligned with a wind direction. The detectors may be arranged such that when the magnitude of the component of wind velocity detected by the first detector is substantially equal to the magnitude of the component of wind velocity detected by the second detector the yaw system is correctly aligned; the method optionally further comprising comparing, at the control system, the component of wind velocity detected by the first detector with that of the second detector and sending a control signal to the yaw system to cause their magnitudes to be substantially equal.

A corresponding control system and computer program are also provided.

BRIEF DESCRIPTION OF THE DRAWINGS

Embodiments of the invention will now be described, by way of example only, and with reference to the accompanying drawings, in which.

DETAILED DESCRIPTION OF THE PREFERRED EMBODIMENTS

The invention generally relates to a method and apparatus for controlling a yaw system or yaw drive on a wind turbine in response to a measurement of a component of wind velocity so as to reduce yaw error. In particular, the wind speed measurements may be performed by a Doppler anemometer such as a LIDAR device.

Embodiments of the present invention use LIDAR (Light Detection and Ranging) in the control of a yaw system. The use of LIDAR to control operation of wind turbines is known, for example, from U.S. Pat. No. 6,320,272 of Lading et al, which teaches the use of a laser wind velocity measurement system such as a LIDAR apparatus mounted on the nacelle. Known LIDAR systems operate by emitting a laser beam in front of the wind turbine to measure the wind conditions. The distance is typically arranged to be between 0.5 and 3 rotor diameters away from the turbine, which is therefore in the order of 50 m to 450 m for a large modern wind turbine. LIDAR operates in a known manner either by detecting air molecules or by detecting particles entrained in the air stream and calculating information about the air flow from these measurements, and particularly wind speed and direction. The detection of wind speed ahead of the turbine blades allows a control system to adjust the pitch of the blades before the wind reaches the blades. Detection of wind direction ahead of the turbine blades allows a control system to adjust the yaw of the turbine before the wind reaches the blades.

In LIDAR systems coherent laser radar measures the velocity of a target as follows: a beam of coherent radiation illuminates the target, and a small fraction of the light is backscattered into a receiver. Motion of the target along the beam direction leads to a change, $\delta v$, in the light's frequency via the Doppler shift, given by:

$$|\delta v| = f(2V_{LOS})/c = (2V_{LOS})/\lambda$$

where c is the speed of light ($3 \times 10^8$ m s-1), $V_{LOS}$ is the component of target speed along the line of sight (i.e., the beam direction), and f and $\lambda$ are respectively the laser frequency and wavelength. This frequency shift is accurately measured by mixing the return signal with a portion of the original beam and picking up the beats on a photodetector at the difference frequency. The LIDAR system comprises the laser optics and detector, which are usually located within the same housing, but it is possible for these components to be separately located.

Figure 1A:
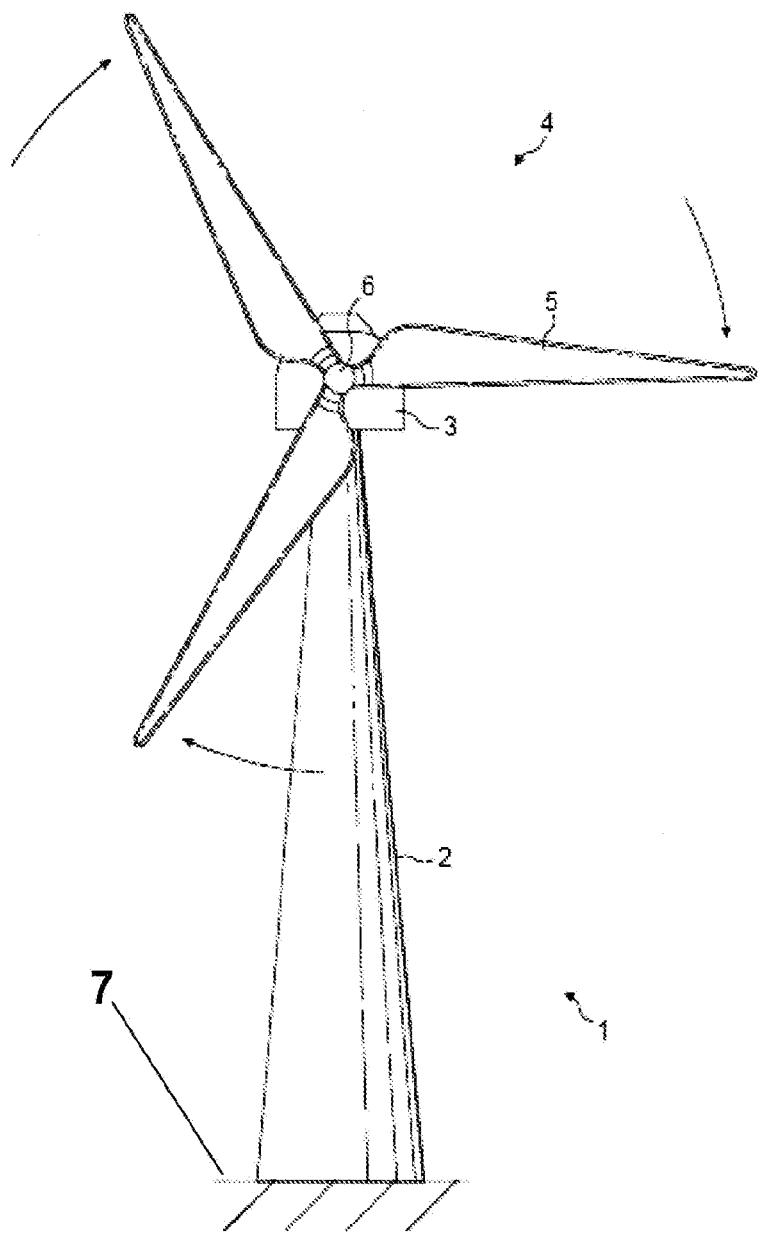
FIG. 1A is a front view of a horizontal axis wind turbine.
Figure 1B:
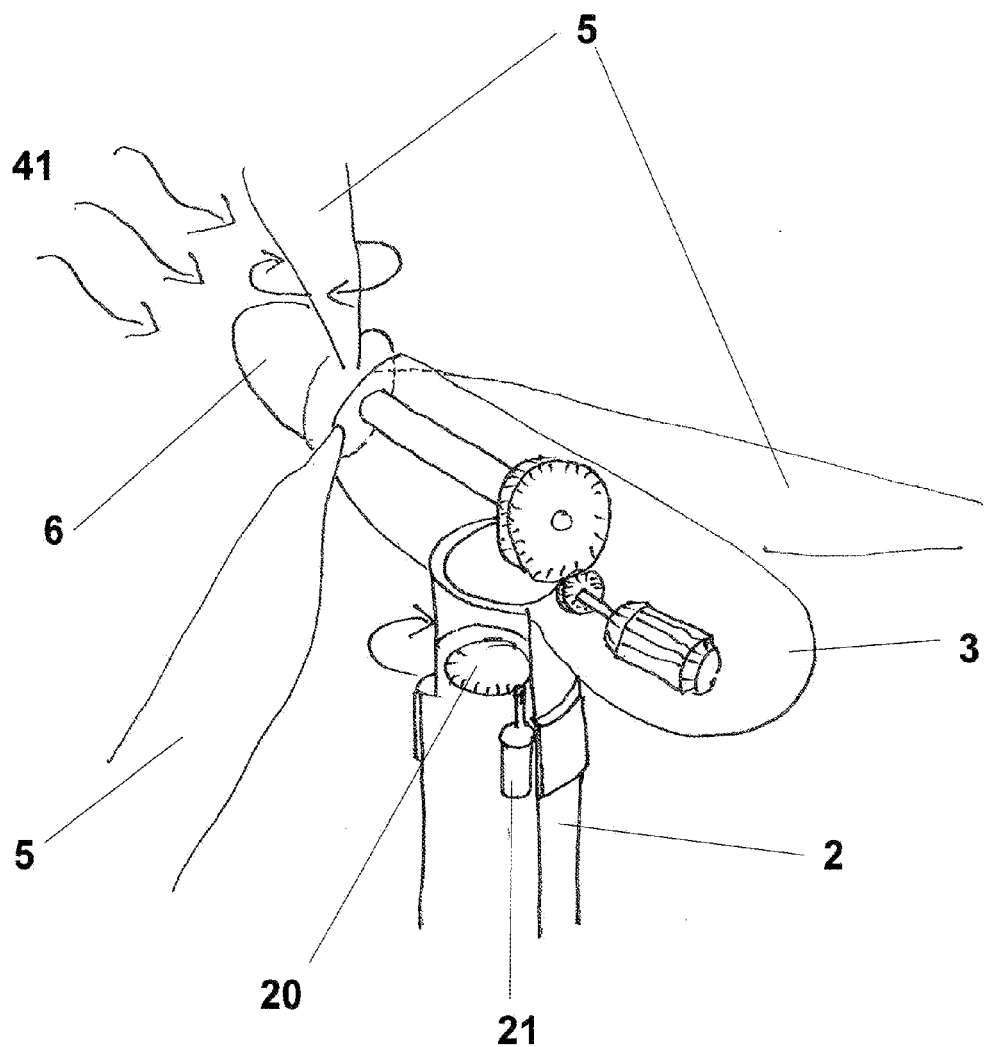
FIG. 1B is a perspective view of a typical horizontal axis wind turbine showing the various components.
Figure 2:
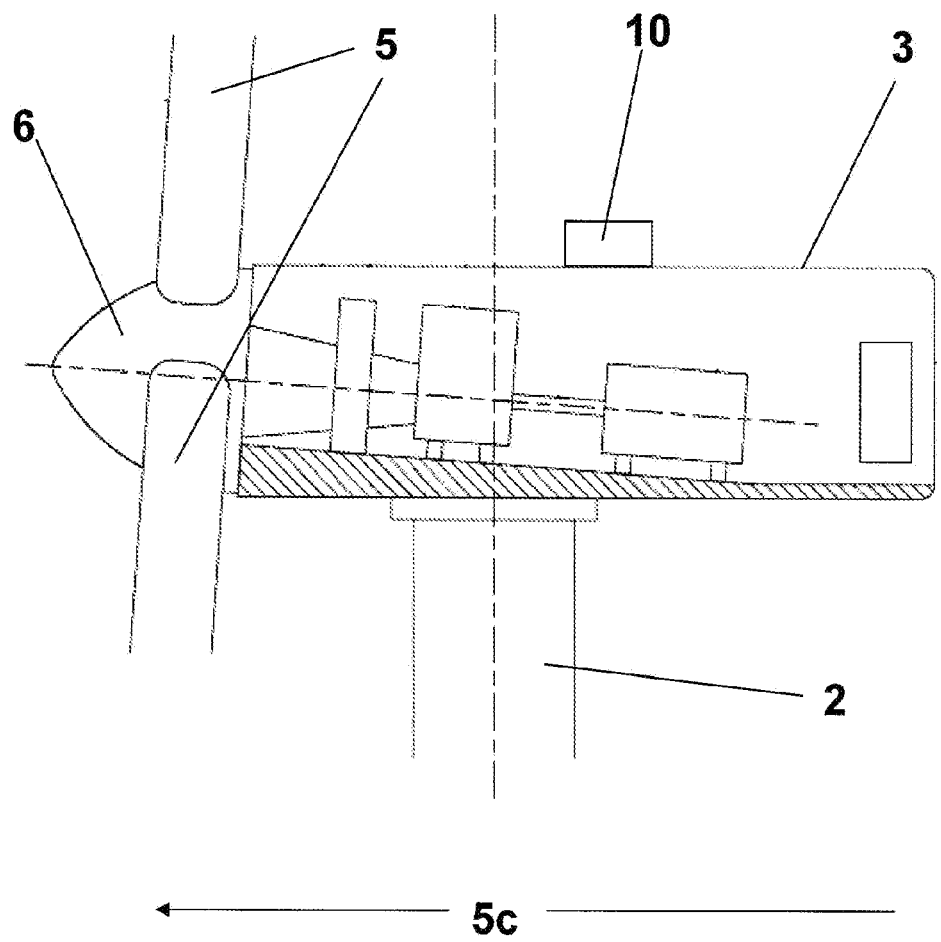
FIG. 2 is a schematic side view of a nacelle portion of a wind turbine according to an embodiment of the invention using common reference numerals with FIG. 1.
Figure 3:
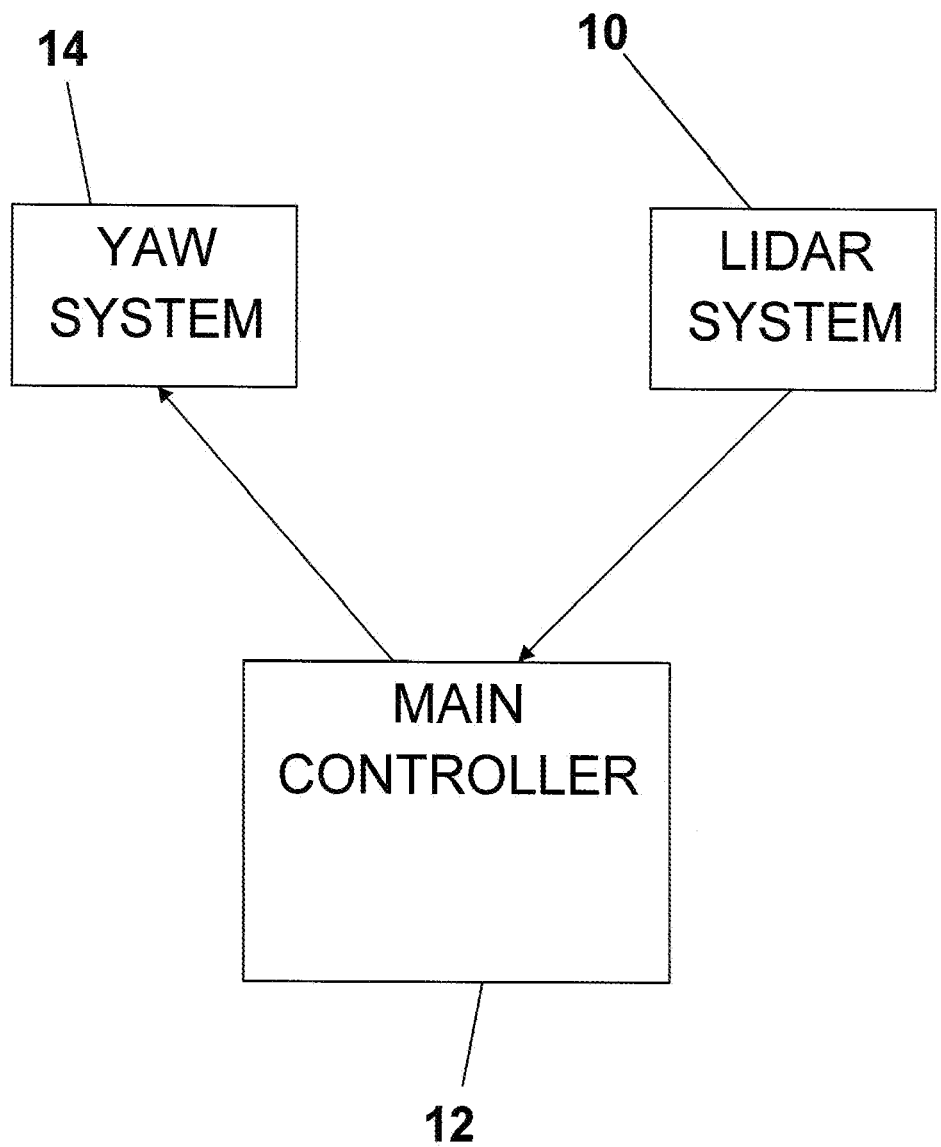
FIG. 3 is a diagram of the components in a yaw control system according to an embodiment of the invention.

FIG. 2 illustrates a schematic side view of an example of the nacelle portion of a wind turbine according to an embodiment of the present invention, using common reference numerals with FIG. 1. Components interior to the nacelle are shown but will not be described. Attached to the nacelle 3 is a LIDAR system or device 10. FIG. 3 shows the components in the yaw control system. The turbine 1 has a main controller 12 connected to sensor equipment in the form of a LIDAR system 10. The LIDAR device housed on the wind turbine nacelle 3 can be used to measure the yaw error of the rotor/nacelle as described below. The main controller may be located in the nacelle or within the tower, or it may be separate from the turbine, with a communication link, such as a wireless connection, between the control system, the LIDAR device and the yaw system. The main controller may perform any necessary calculations, and may be distributed over multiple locations.

Figure 4:
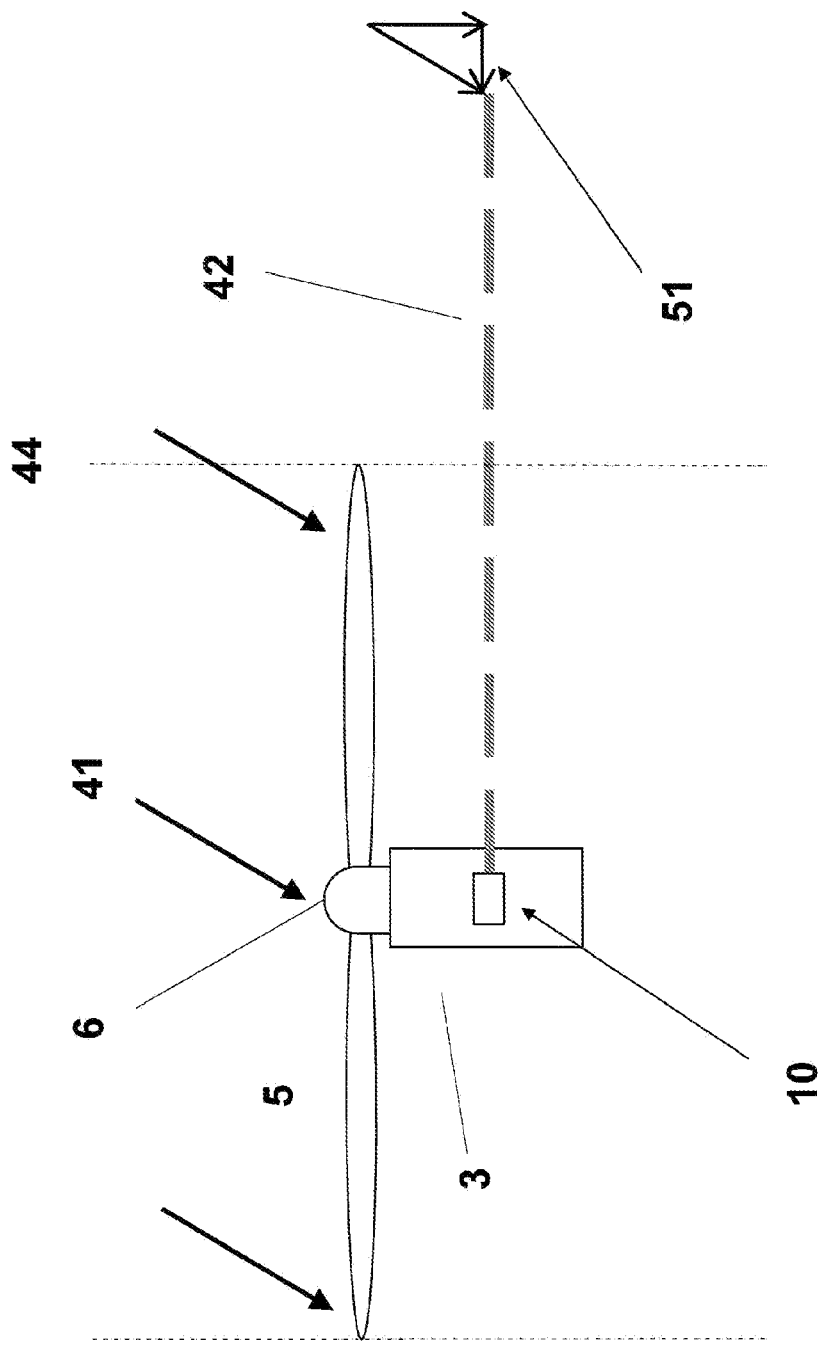
FIG. 4 is a schematic view of a turbine seen from above according to an embodiment of the invention showing a LIDAR beam and component of wind speed measured.

FIG. 4 shows a schematic view of the wind turbine of FIG. 2 from above. The LIDAR system 10 is mounted on or within the nacelle 3 in a position such that a LIDAR beam 42 points in a direction that is substantially perpendicular to the axis of rotation of the rotor.

The LIDAR beam measures the component of wind velocity in the beam direction. The LIDAR beam can determine the magnitude of the velocity component and whether that velocity component is positive or negative (i.e. whether that component of the wind is in the direction towards or away from the detector), If a LIDAR beam is pointing in a direction that is perpendicular to the wind, then the velocity measurement will be zero along the beam direction or line of sight. Therefore, in the case where the wind direction 41 is parallel to the axis of rotation of the rotor, the LIDAR beam would measure a wind velocity of zero. The wind velocity as measured by the LIDAR system can therefore be seen as a measure of the yaw error of the turbine. A velocity of zero indicates that the rotor is facing directly into the wind. The wind velocity component measurement can be provided to main controller 12, shown in FIG. 3, which determines whether a change in azimuth of the nacelle is required. The LIDAR system provides a constant or periodic set of measurements indicating wind speed in the direction along the LIDAR line of sight. In its simplest form the control system may be arranged to receive the LIDAR measurements and to adjust the yaw system until the wind speed measured by the LIDAR beam is zero, or substantially zero. At this point the yaw error will also be substantially zero and the rotor will therefore be facing into the oncoming wind for maximum efficiency.

In order to determine the point at which wind speed is zero the LIDAR could be calibrated to provide accurate velocity detection, such that a reading of zero from the LIDAR system indicates that the yaw error is substantially zero. Alternatively, standard minimisation techniques could be used, such as differentiation, whereby the control system processes the data received from the LIDAR system to determine a minimum value of wind velocity and this is taken to be the zero velocity value. This allows a sensor device that is not properly calibrated to be used.

It may be preferred that the corrections made by the control system to correct yaw error are not too sensitive, so as to avoid continuous small yaw movements. Various operating methods can be employed. A threshold could be employed, whereby the yaw system is only activated by the controller if the LIDAR system detects a wind speed above a certain threshold. This would indicate a yaw error above a particular value, and the yaw system would then be activated to reduce the yaw error. For example, the main controller 12 may be arranged only to adjust the turbine yaw angle if the LIDAR measured wind velocity is above a particular threshold. The threshold could be above 3 or 4 m/s. Alternatively, or in addition, the main controller may monitor the LIDAR data and only activate the yaw system if the wind velocity exceeds a certain threshold for a predetermined period of time. For example, the main controller may only activate the yaw system to minimize yaw error if the LIDAR measured wind velocity exceeds a threshold for 10 seconds, 30 seconds or 60 seconds.

If a sufficient wind speed is detected by the LIDAR system 10 for a sufficient period of time the main controller 12 causes the yaw system 14 to rotate the nacelle and therefore the LIDAR system as well. The main controller will continue to operate the yaw system until a wind velocity of zero, or substantially zero, is achieved. The system can operate with minimum processing capability since the main control system can be arranged to seek out a yaw position that shows a minimum wind velocity, rather than needing to calculate the yaw error based on measured or calculated wind directions. If the wind velocity component, measured by the LIDAR, increases as the LIDAR system rotates, then the control system will reverse the direction of rotation such that the measured wind speed decreases. In addition, or as an alternative, the main controller may also receive information from a wind direction detector, such as a wind vane. The wind information is used by the main controller to determine which direction to turn the yaw system (clockwise or anti-clockwise) to reduce the yaw error avoiding the controller activating the yaw system in the wrong direction.

Although a wind velocity component measurement of zero may, in some embodiments indicate a yaw error of zero, a wind velocity above zero cannot necessarily be directly converted into a value for the yaw error. For example, if a low wind velocity component is detected, this may indicate a small yaw error for a high overall wind speed, or a large yaw error for a low overall wind speed. By supplying additional wind speed information from a wind speed measuring device such as, for example, an anemometer or additional LIDAR system, it would be possible to calibrate the system such that an accurate yaw error can be determined. The yaw error could be calculated by comparing the velocity component measured by the LIDAR with the total magnitude of the wind velocity detected by the wind speed measuring device. An additional LIDAR beam pointing straight ahead, along the rotor axis, could be used for this purpose, however, one of the advantages of simply aligning the rotor/nacelle to a wind velocity of zero is the minimal processing required by the main controller, and additional velocity detection is not a requirement. In embodiments in which wind velocity information is used to determine a value for the yaw error the calculations could be performed at the LIDAR devices or at a different location. The main controller could be considered to be a distributed system incorporating any processing system located at the LIDAR devices or otherwise.

The LIDAR system can measure the velocity of air at multiple predetermined distances simultaneously. It is therefore possible that embodiments of the invention will measure the wind velocity at any point from zero meters (at the LIDAR beam emission point) up to the LIDAR detection limit which may be around 200 m beyond the rotor edge, or 300 m-400 m from the emission point in total, and to measure wind velocity at multiple points. However, it is preferred that the wind velocity measurements are taken from points along the line of sight that are beyond the rotor diameter, as illustrated by line 44 in FIG. 4, to avoid disturbed airflow from the rotor. That is, the detection point of the LIDAR system lies along the line of sight at a distance equal to or greater than the radius of the rotor and preferably between one and two times the radius of the blades from the detector. For LIDAR systems this is a comparatively short range. The measurement distance is preferably between 1 and 2 times the rotor blade length, and more preferably between 1.2 and 2 times the rotor blade length.

A property of detectors that may be leveraged in embodiments of the invention, such as LIDAR detectors, is known as the probe depth. The LIDAR detector(s) may actually detect the wind velocity component over a distance range, rather than at a specific point, as determined by the LIDAR detector parameters. The probe depth is a spatial filter which reflects the time averaged sampling of the photon detection. It is typically a Gaussian shape. The detector can be arranged such that the distribution shape begins at the point at which the induction effect caused by the rotor blades acting on the wind begins, and ends at a distance at which the induction effect has little or substantially no impact. For example, the distribution may start at 1.2 times the radius of the rotor and finish at twice the radius of the rotor.

Figure 5:
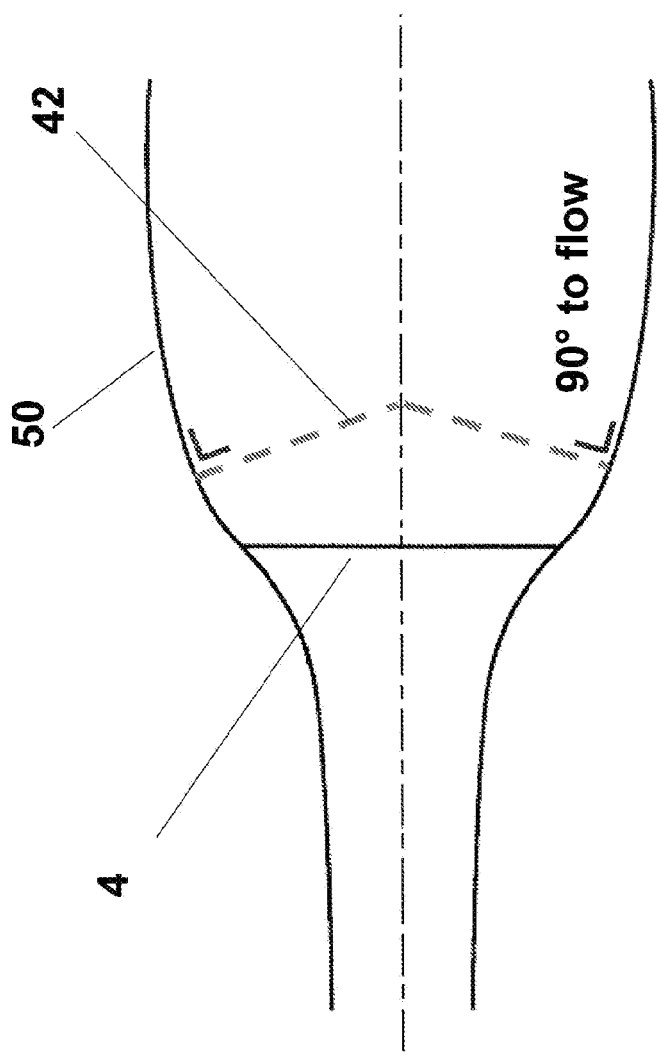
FIG. 5 is a schematic view showing air flow around a rotor, as seen from above, and possible LIDAR beam directions.

The embodiments described above use a LIDAR or similar system arranged to provide a beam substantially perpendicular to the axis of rotation of the rotor, however this is not a necessity. As illustrated in FIG. 5, the optimal direction may in fact be to point the LIDAR beams 42 at a slight angle to the perpendicular direction to account for the expansion of the air flow 50 around the rotor 4. The LIDAR beams would therefore be positioned such that they are facing substantially perpendicular to the expected airflow around the rotor when the rotor is facing in the wind direction. It should be noted that the line of sight angles for a beam perpendicular to expected airflow around the rotor may be different on one side of the turbine to the other side due to the twisting of the wind as it enters the rotor. The beam angle required such that the LIDAR beams are facing substantially perpendicular to the expected airflow around the rotor when the rotor is aligned in the prevailing wind direction may be determined experimentally, for example by yawing the turbine into the wind (the wind direction being determined by independent measurement) and searching for the point at which the line of sight velocity drops to zero, for each beam, and repeating such a measurement for a plurality of different wind speeds. A database or table of beam angles, relative to the axis of rotation of the rotor or some other reference point, against wind speed values could then be produced. Multiple beam angles could then be provided, by providing multiple beams at different angles each corresponding to a position perpendicular to the expected airflow for a given wind speed. Alternatively, each beam or detector could be rotatably mounted, on a rotatable bearing or other rotating means, such that the beam direction relative to the reference point can be varied, and fixed at a desired angle, in response to a detected wind speed and the corresponding value in the database/table.

The LIDAR beam could be arranged to face in either direction parallel to the axis of rotation of the rotor. In such an embodiment, rather than the control system 12 seeking a minimum in wind velocity it would seek out a maximum, at which point the yaw angle would be at a minimum. Similarly, the LIDAR beam could be arranged to face any other direction at an angle to the axis of rotation of the rotor with the main control system 12 being arranged to locate a wind velocity of a certain proportion of the maximum or minimum velocity. With such embodiments the LIDAR measurements would preferably be taken at a point beyond the line parallel to the rotational axis of the rotor, when viewed from above, and passing through the edge of the blade disc (i.e. the line 44 in FIG. 4). Such embodiments may require additional wind direction information such that the control system knows when it has reached a maximum in wind velocity so as to avoid overshooting on the yaw angle adjustment. Arrangements in which the LIDAR beam is perpendicular to the axis of rotation of the rotor, or the expected wind direction around the rotor are advantageous as they do not need to be calibrated in this manner.

Embodiments in which the line of sight of the detectors are facing perpendicular, or substantially perpendicular, to the axis of rotation of the rotor, at least when viewed from above, are also advantageous because this increases the sensitivity of the wind velocity component measurements. In particular, the wind velocities measured when the turbine is near a zero yaw error position will be lower, and may be of the order of around 10 m/s or less. In comparison, if the detectors were facing parallel to the axis of rotation, far higher wind velocity component values would be detected when the turbine was at or near a zero yaw error position.

It is preferred that the LIDAR beam is parallel to the ground/turbine base 7 so that the wind velocity component measured is the component parallel to the ground/turbine base 7 and thus parallel to the rotor direction 5b/nacelle direction 5c. However, Doppler anemometers measure the component of wind speed along the line of sight (i.e. in the beam direction), and the beam does not strictly need to be parallel to the ground in order to measure this component of wind direction. Instead, the beam can point at any angle that would allow the beam to measure a component of the wind direction parallel to the ground. This could be any angle less than 90° relative to the ground. A measured wind velocity of zero would still indicate a yaw error of zero.

The LIDAR detector may be mounted directly onto the nacelle, or it may be mounted within the nacelle with a LIDAR transparent window, or a hole, in the nacelle to allow the LIDAR beam to pass through. Allowing the LIDAR system to be mounted directly onto the nacelle makes it possible to retrofit a system according to embodiments of the invention onto existing wind turbines. The LIDAR detector can be mounted anywhere that allows it to rotate about the yaw axis, such that the wind velocity measurements of the detector change as it changes position about the yaw axis.

Figure 6:
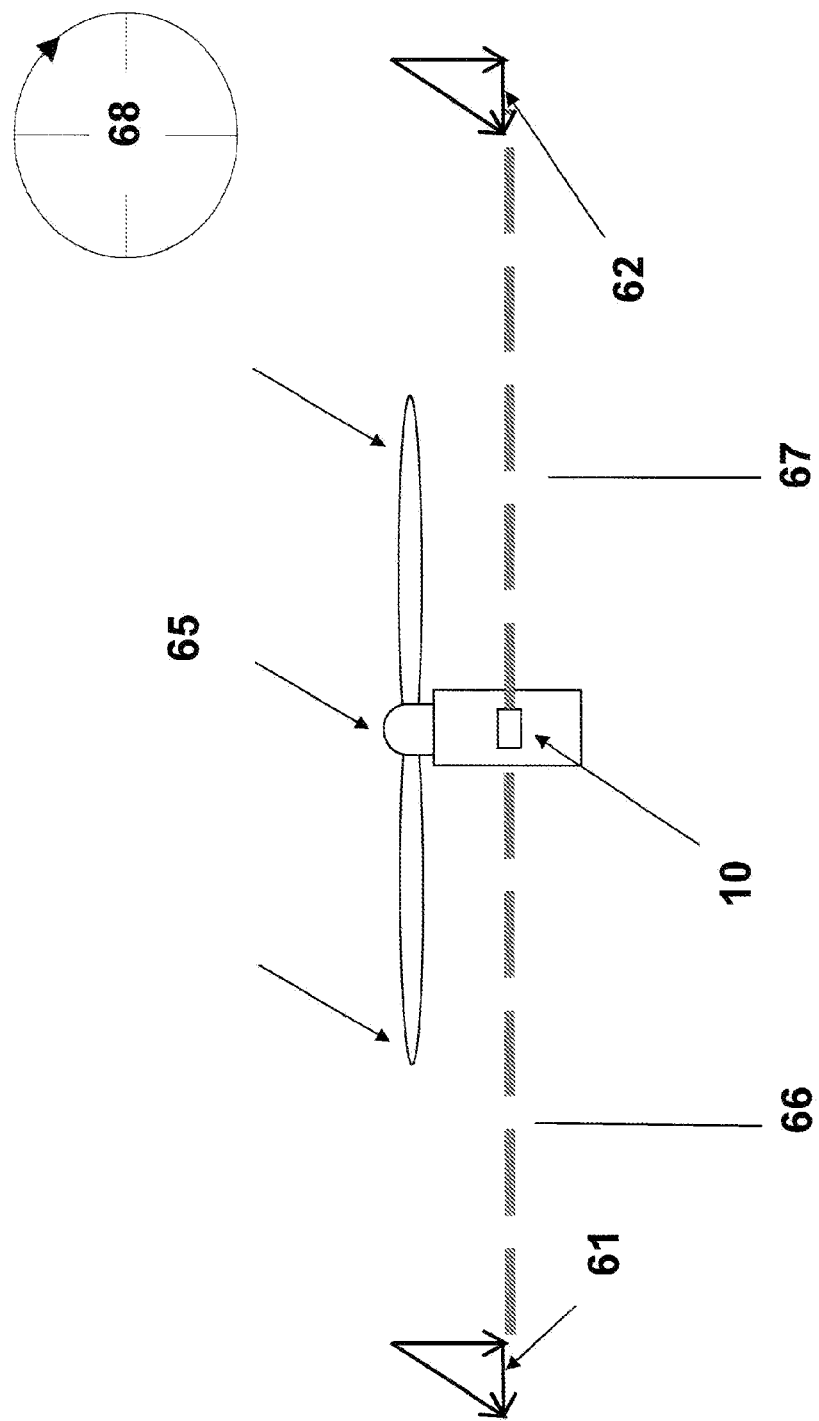
FIG. 6 is a schematic view of a turbine seen from above according to an embodiment of the invention showing LIDAR beams and components of wind speed measured.

Multiple beams may be used for more accurate wind speed detection. FIG. 6 shows a double beam arrangement. The line of sight velocities 61 and 62 are shown. Each LIDAR beam measures the velocity component of incoming wind 65 along the direction of the beams 66 and 67. In the example of FIG. 6 the component 62 is detected as a positive velocity, and the component 61 as a corresponding negative velocity. The positive and negative velocities may, of course, be defined in the opposite manner. If the line of sight velocities 61 and 62 from both beams are non-zero then the turbine will yaw in the direction which will drive the line of sight velocity to zero. The required yaw direction can be determined based on the positive or negative signs of the velocity components, with the system yawing clockwise towards the positive line of sight velocity to reduce yaw error as indicated by 68.

Alternatively, the turbine could yaw in the direction which will make both line of sight velocities, or their magnitudes, equal. Rather than attempting to yaw the turbine to the position in which both of the beams detect a velocity component of zero, or some other predetermined value, the value from one detector could be compared with the value from the other. It can be seen from FIG. 6 that when the velocity components measured by beams 66 and 67 are the same, or substantially the same, the turbine will be yawed into the wind. An advantage of such a system is compensation for wake expansion of the wind around the rotor blade as indicated in FIG. 5. In particular, the absolute reading of both beams 66 and 67 may not be zero when the turbine is correctly yawed into the wind due to the wake expansion effect. This would mean that seeking a zero value for both beams (or a single beam arrangement) may not function as well as desired if the beam were not detecting wind velocity far enough away from the detector so as to minimise the effect of the wake expansion. However, by seeking the same velocity component value for both detector beams this can be compensated for.

Figure 7:
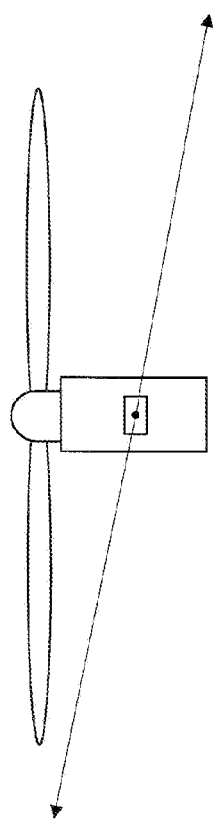
FIG. 7 is a schematic showing an alternative beam arrangement.
Figure 8:
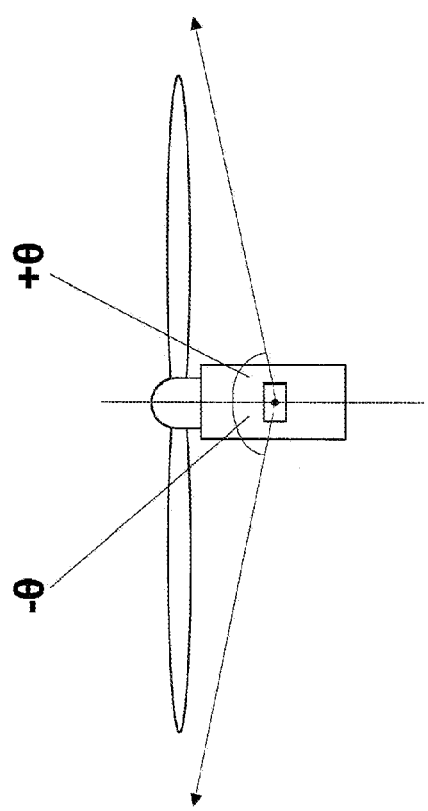
FIG. 8 is a schematic showing an alternative beam arrangement.

Preferably the line of sight of the LIDAR beams would be pointing in opposite directions perpendicular to the rotor axis as shown in FIG. 6. However, other alternatives are possible, and FIGS. 7 and 8 are intended to demonstrate this. In FIG. 7, line of sight of the first detector points in substantially the opposite direction to the line of sight of the second detector, as with FIG. 6, but they are not perpendicular to the axis of rotation of the rotor, at least when viewed from above. The system could be arranged to compare the magnitudes of the velocity components detected by each detector, the turbine being correctly yawed when these magnitudes are substantially equal.

Alternatively, as shown in FIG. 8, the first detector and the second detector are arranged such that the angle θ formed between the line of sight of the first detector and the axis of rotation of the rotor, when viewed from above, is substantially equal and opposite to the angle formed between the line of sight of the second detector and the axis of rotation of the rotor. This is similar to the arrangement of FIG. 5. Again, this allows the system to compare velocity components of the two beams and determine when they are equal, equal velocity components corresponding to a yaw error of zero or substantially zero. The system of FIG. 8 could match velocity components rather than magnitudes thereof, since a zero yaw error position would result in positive velocity components of substantially the same magnitude for both beams. However, as described in relation to FIG. 5, the angles for each beam may not necessarily be equal so as to account for the effect of rotation induced in the wind by the rotor.

Using two or more beams adds fidelity to the system since it allows measurements to be taken both sides of the rotor as illustrated in FIGS. 5-8. Multiple beams also eliminate errors caused by flow or wake expansion or deflected wakes, which may lead a single beam to measure a line of sight velocity of zero, when in actual fact the wind in front is hitting the rotor at an angle. In the arrangement of FIG. 6 the beams are arranged to extend in opposite directions, such that each beam is perpendicular to the axis of rotation of the rotor, but pointing 180° from each other. Alternatively, the beams may be used at any other angle to one another to provide multiple wind speed measurements that can be converted into a yaw error value or used directly by the yaw control system.

Rather than using a single detector to detect a component of wind velocity in a particular direction, multiple beams could be used, and the results of each beam could be averaged or combined in some other manner to give a more accurate reading of wind speed. The detectors could be distributed on turbine, and particularly on the nacelle, and may be located at regular intervals. Alternatively, the detectors could be located adjacent to each other. For example, in the system of FIG. 6, three beams could be provided in each direction, rather than one in each direction.

Figure 9:
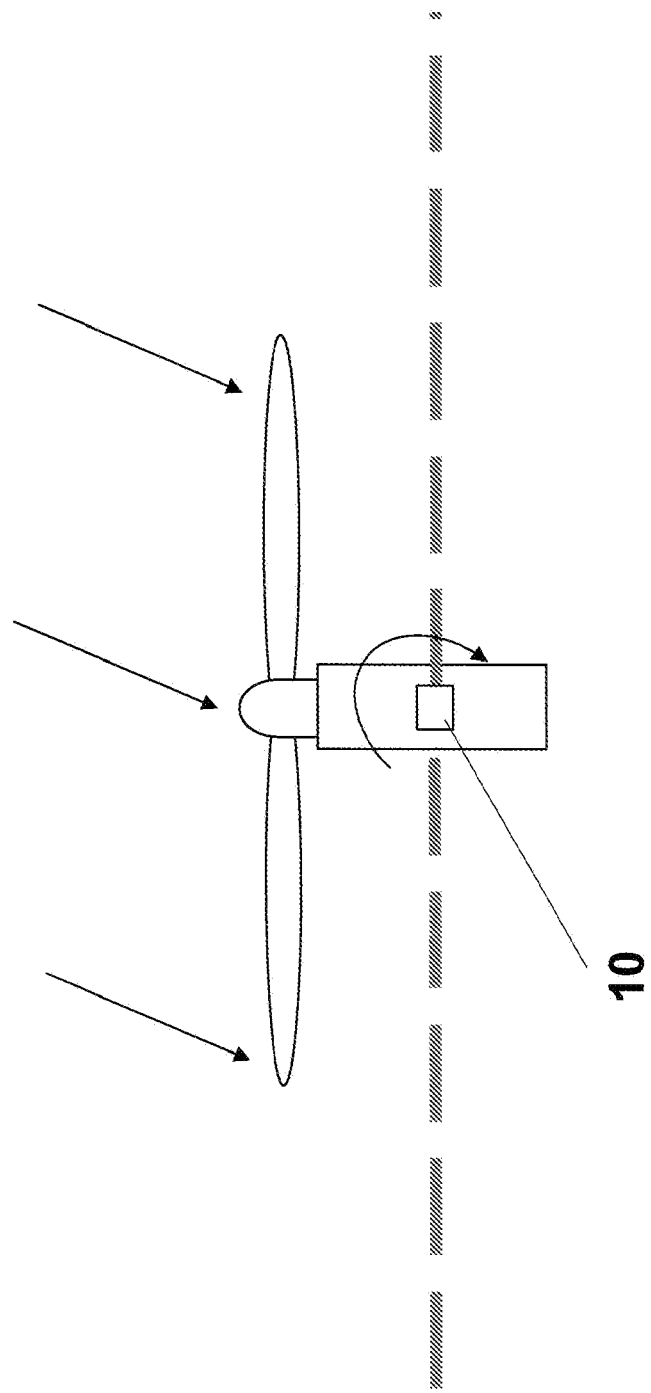
FIG. 9 is a schematic view showing an alternative arrangement using LIDAR beams that are able to rotate around an axis, such as around the axis of the tower, in addition to the rotation provided by the yaw system.

An alternative to using two or more fixed beams is to use one, two (or more) LIDAR beams that are able to rotate around an axis, such as around the axis of the tower, independently of, and in addition to, the rotation provided by the yaw system. The LIDAR devices would be mounted on rotating means, mounted on or in the nacelle, which would allow the LIDAR beams to be rotated. Such an arrangement is shown in FIG. 9. The rotating beam or beams would allow for measurements in all directions and may provide a more detailed picture of the wind flow around the turbine. The information detected by the rotating beams could be provided to the control system to determine a wind velocity profile. The control system may determine the yaw position that would provide a predetermined yaw error that is below a threshold value or substantially zero as described above. A detector integral or external to the rotating means preferably provides information to the computer system on the rotational positioning of the LIDAR beam, either relative to the yaw system or relative to an absolute bearing such as north.

Although embodiments have been described using LIDAR to determine the wind velocity, it should be noted that other systems and methods can be used, provided they can give an indication of a wind velocity component at a point a fixed distance from the turbine. Preferable systems are Doppler anemometers and those that provide the component of wind speed along the direction of a linear beam or similar. These could include SODAR, RADAR or LDV.

Embodiments of the invention have been described in relation to upwind turbines, in which the nacelle is yawed such that the rotor faces into the upwind direction to ensure correct alignment of the rotor relative to the prevailing wind. It should be appreciated that any of the above embodiments of the invention could be equally applied to downwind turbines in which the nacelle is yawed such that the rotor faces into the downwind direction to ensure correct alignment of the rotor relative to the prevailing wind.

For the avoidance of doubt, any of the embodiments of the invention described herein may be considered to control turbine yaw in response to at least one detected wind velocity component, without requiring the intermediate step of calculating, measuring or determining a wind direction or the overall direction of the wind causing the turbine rotor/blades to rotate.

The invention claimed is:

1. A wind turbine, comprising:
a rotor comprising one or more rotor blades and a hub, the hub being attached to a nacelle;
a yaw system for rotating the nacelle;
a first detector for detecting a component of wind velocity along a line of sight, wherein the line of sight of the first detector does not pass through an area swept out by the one or more rotor blades during rotation of the one or more rotor blades, the first detector being mounted to rotate in response to an action of the yaw system; and
a control system coupled to the first detector and arranged to compare the detected component of wind velocity with a wind velocity value and to control the yaw system in response to the comparison.

2. The wind turbine of claim 1, further comprising a second detector, coupled to the control system, for detecting a component of wind velocity along a line of sight, the second detector being mounted to rotate in response to the action of the yaw system;
wherein the wind velocity value with which the detected component of wind velocity from the first detector is compared is a component of wind velocity detected by the second detector.

3. The wind turbine of claim 2, wherein the first detector and the second detector are arranged such that when a magnitude of the component of wind velocity detected by the first detector is substantially equal to a magnitude of the component of wind velocity detected by the second detector then the yaw system is correctly aligned; and
the control system is arranged to compare the component of wind velocity detected by the first detector with that of the second detector and to control the yaw system to cause their magnitudes to be substantially equal.

4. The wind turbine of claim 2, wherein the first detector and the second detector are arranged such that the line of sight of the first detector points in substantially an opposite direction to the line of sight of the second detector.

5. The wind turbine of claim 2, wherein the first detector and the second detector are arranged such that an angle formed between the line of sight of the first detector and an axis of rotation of the rotor is substantially equal and opposite to the angle formed between the line of sight of the second detector and the axis of rotation of the rotor.

6. The wind turbine of claim 1, wherein the first detector is arranged such that the line of sight is substantially perpendicular to an axis of rotation of the rotor.

7. The wind turbine of claim 1, wherein the first detector is arranged such that the line of sight is substantially perpendicular to an expected airflow around the rotor when the yaw system is correctly aligned.

8. The wind turbine of claim 7, further comprising a second detector having a line of sight in a different direction to the first detector, wherein the second detector is arranged such that the line of sight of the second detector is substantially perpendicular to the expected airflow around the rotor.

9. The wind turbine of claim 1, wherein the control system is arranged to control the yaw system to make the detected component of wind velocity and the wind velocity value, or their magnitudes, substantially equal.

10. The wind turbine of claim 1, wherein the control system is arranged to control the yaw system to rotate the nacelle until a predetermined wind velocity is measured by the first detector.

11. The wind turbine of claim 10, wherein the predetermined wind velocity is one or more of: a minimum velocity and substantially zero.

12. The wind turbine of claim 1, wherein the first detector comprises at least one of: a Doppler anemometer, a LIDAR detector, a SODAR detector, a RADAR detector, and a LDV detector.

13. The wind turbine of claim 2, wherein the first detector is arranged to detect a wind velocity component at a distance from the second detector, the distance being greater than or equal to a length of the one or more rotor blades.

14. The wind turbine of claim 13, wherein the distance is between 1 and 2 times the rotor blade length, and preferably between 1.2 and 2 times the length of the one or more rotor blades.

15. The wind turbine of claim 1, wherein the first detector is arranged to detect wind velocity components at the plurality of distances along the line of sight of the first detector.

16. The wind turbine of claim 1, wherein the control system is further arranged to receive an output from a wind speed detection device, and the control system being arranged to also control the yaw system in response to the output including a wind speed.

17. The wind turbine of claim 1, wherein the first detector is arranged such that when a yaw error is substantially zero the line of sight of the first detector is pointing substantially perpendicular to an expected airflow around the rotor.

18. The wind turbine of claim 1, wherein the first detector is mounted on the nacelle.

19. The wind turbine of claim 1, wherein the first detector is additionally mounted on rotating means, allowing the first detector to rotate relative to the nacelle, and the component of the wind velocity detected by the first detector is provided to the control system to determine a wind velocity profile and to control the yaw system in response to the wind velocity profile.

20. A method of controlling a wind turbine, the wind turbine having a rotor comprising one or more rotor blades and a hub, the hub being attached to a nacelle; a yaw system for rotating the nacelle; a first detector for detecting a component of wind velocity along a line of sight of the first detector, the first detector being mounted to rotate in response to an action of the yaw system, and a control system coupled to the first detector, the method comprising at a controller of the control system:
   receiving a value from the first detector indicating the component of wind velocity along the line of sight of the first detector, wherein the line of sight of the first detector does not pass through an area swept out by the one or more rotor blades during rotation of the one or more rotor blades;
   comparing the wind velocity component with a wind velocity value to determine if the rotor is correctly aligned with a wind direction; and
   sending a control signal to the yaw system, in response to the comparison, to rotate the nacelle if the rotor is not correctly aligned with a wind direction.

21. The method of claim 20, wherein the wind turbine further comprises a second detector, coupled to the control system, for detecting a component of wind velocity along a line of sight of the second detector, the second detector being mounted to rotate in response to the action of the yaw system;
   wherein the wind velocity value with which the detected component of wind velocity from the first detector is compared is the component of wind velocity detected by the second detector.

22. The method of claim 21, wherein the first detector and the second detector are arranged such that when a first magnitude of the component of wind velocity detected by the first detector is substantially equal to a second magnitude of the component of wind velocity detected by the second detector then the yaw system is correctly aligned; the method further comprising:
   comparing, at the control system, the component of wind velocity detected by the first detector with that of the second detector and sending a control signal to the yaw system to cause the nacelle to rotate unless the first magnitude and the second magnitude are substantially equal.

23. The method of claim 20, implemented in a wind turbine.

24. The method of claim 20, further comprising sending control signals to control the yaw system to yaw the wind turbine when the detected component of wind velocity and the wind velocity value, or their magnitudes, are not substantially equal.

25. The method of claim 20, further comprising sending a control signal to control the yaw system to rotate the nacelle until a predetermined wind velocity is measured by the detector.

26. The method of claim 25, wherein the predetermined wind velocity is a minimum velocity and preferably substantially zero.

27. The method of claim 20, further comprising detecting, using the first detector, wind velocity components at a distance from the first detector, the distance being greater than or equal to a length of the one or more rotor blades.

28. The method of claim 27, wherein the distance is between 1 and 2 times the length, and preferably between 1.2 and 2 times the length.

29. The method of claim 20, further comprising detecting, using the first detector, wind velocity components at a plurality of distances from the first detector, along the line of sight of the first detector.

30. The method of claim 20, wherein the first detector is additionally mounted on rotating means, allowing the first detector to rotate relative to the nacelle, the method further comprising:
   rotating the first detector relative to the nacelle and detecting a plurality of wind velocity components;
   providing the detected wind velocity components to the control system to determine a wind velocity profile; and
   sending control signals to the yaw system to control a turbine yaw in response to the wind velocity profile.

31. The method of claim 20, wherein the determining whether the rotor is correctly aligned with the wind direction further comprises comparing the detected component of wind velocity with a predetermined wind velocity value, and wherein a control signal is sent to the yaw system to rotate the nacelle if the detected component of wind velocity is higher than the predetermined wind velocity value.

32. The method of claim 31, wherein the determining whether the rotor is correctly aligned with the wind direction comprises determining a yaw error based on the received value.

33. A control system for controlling an operation of a wind turbine, the wind turbine comprising: a rotor comprising one or more rotor blades and a hub, the hub being attached to a nacelle; and a yaw system for rotating the nacelle;

the control system comprising:

a first detector for detecting a component of wind velocity along a line of sight of the first detector, wherein the line of sight of the first detector does not pass through an area swept out by the one or more rotor blades during rotation of the one or more rotor blades, the first detector being mounted to rotate in response to an action of the yaw system; and a controller coupled to the first detector for providing an output control signal for the wind turbine, wherein the controller is arranged to:

receive values from the first detector indicating a component of wind velocity along the line of sight of the first detector;

compare the component of wind velocity with a wind velocity value; and send a control signal to the yaw system, in response to the comparison, to rotate the nacelle if the rotor is not aligned with a wind direction.

34. The control system of claim 33, further comprising a second detector, coupled to the controller, for detecting a component of wind velocity along a line of sight of the second detector, the second detector being mounted to rotate in response to the action of the yaw system;

wherein the wind velocity value with which the detected component of the wind velocity along the line of sight of the first detector is compared is the detected component of the wind velocity along the line of sight of the second detector.

35. The control system of claim 34, wherein the first detector and the second detector are arranged such that when a first magnitude of the component of wind velocity detected by the first detector is substantially equal to a second magnitude of the component of wind velocity detected by the second detector the yaw system is correctly aligned; and the controller is arranged to compare the component of wind velocity detected by the first detector with that of the second detector and to control the yaw system to cause the first magnitude and the second magnitude to be substantially equal.

36. The control system of claim 34, wherein the first detector and the second detector are arranged such that the line of sight of the first detector points in substantially an opposite direction relative to the line of sight of the second detector.

37. The control system of claim 34, wherein the first detector and the second detector are arranged such that an angle formed between the line of sight of the first detector and an axis of rotation of the rotor is substantially equal and opposite to an angle formed between the line of sight of the second detector and the axis of rotation of the rotor.

38. The control system of claim 34, wherein the second detector is arranged such that the line of sight of the second detector does not pass through the area swept out by the one or more rotor blades during rotation of the one or more rotor blades.

39. The control system of claim 34, wherein the first detector and the second detector are arranged such that their lines of sight are substantially perpendicular to an axis of rotation of the rotor.

40. The control system of claim 34, wherein the first detector and the second detector are arranged such that their lines of sight are substantially perpendicular to an expected airflow around the rotor when the yaw system is correctly aligned.

41. A computer program product containing computer code arranged to control the wind turbine of claim 1.

* * * * *